(12) United States Patent
Hartranft et al.

(10) Patent No.: US 11,628,454 B2
(45) Date of Patent: Apr. 18, 2023

(54) DUAL SPRAY NOZZLE TIP ASSEMBLY

(71) Applicant: DLHBOWLES, INC., Canton, OH (US)

(72) Inventors: Evan Hartranft, Bowie, MD (US); Samuel Bernstein, Riva, MD (US); Michael Stephenson, York, PA (US)

(73) Assignee: DLHBOWLES, INC., Canton, OH (US)

( * ) Notice: Subject to any disclaimer, the term of this patent is extended or adjusted under 35 U.S.C. 154(b) by 0 days.

(21) Appl. No.: 16/815,763

(22) Filed: Mar. 11, 2020

(65) Prior Publication Data

US 2020/0290066 A1    Sep. 17, 2020

Related U.S. Application Data

(60) Provisional application No. 62/859,393, filed on Jun. 10, 2019, provisional application No. 62/816,321, filed on Mar. 11, 2019.

(51) Int. Cl.
*B05B 7/08*        (2006.01)
*A61C 17/02*       (2006.01)

(52) U.S. Cl.
CPC ........ *B05B 7/0815* (2013.01); *A61C 17/0217* (2013.01)

(58) Field of Classification Search
CPC .......................... B05B 7/0815; A61C 17/0217
USPC ........................ 239/299, 423, 424, 424.5, 425
See application file for complete search history.

(56) References Cited

U.S. PATENT DOCUMENTS

| 3,374,789 A | 3/1968 | Maurer |
| 4,531,913 A | 7/1985 | Taguchi |
| 5,944,507 A * | 8/1999 | Feldermann ............ F23L 7/007 |
| | | 431/185 |

FOREIGN PATENT DOCUMENTS

| CN | 1087843 | 6/1994 |
| CN | 101189069 | 5/2008 |
| CN | 201617966 | 11/2010 |
| CN | 102639247 | 8/2012 |
| DE | 19916786 | 10/2000 |
| DE | 102012008875 | 11/2013 |

(Continued)

OTHER PUBLICATIONS

International Searching Authority European Patent Office, International Search Report and Written Opinion for PCT/US2020/022059 dated Jun. 4, 2020.

*Primary Examiner* — Christopher S Kim
(74) *Attorney, Agent, or Firm* — McDonald Hopkins LLC

(57) ABSTRACT

Provided is a dual spray nozzle tip assembly having a geometry that is split into several sub components to enable robust manufacturing and assembly of the resulting nozzle. The nozzle tip assembly is configured to be attached to a device configured to provide a pressurized fluid and gas therefrom. The nozzle tip assembly comprising an elongated body defining a fluid lumen and at least one gas lumen between a distal end and a proximal end. The elongated body including at least an attachment profile, a straight portion, and an outlet region. The outlet region defines a shear nozzle in communication with the fluid lumen and at least one gas outlet in communication with the at least one gas lumen, the outlet region is configured to direct pressurized gas from the at least one gas outlet and to produce a desired spray pattern from the shear nozzle.

7 Claims, 25 Drawing Sheets

(56) References Cited

FOREIGN PATENT DOCUMENTS

EP 1145689 10/2001

* cited by examiner

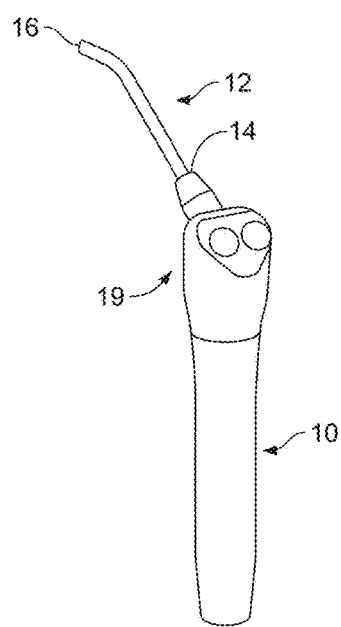
FIG. 1
(Prior Art)
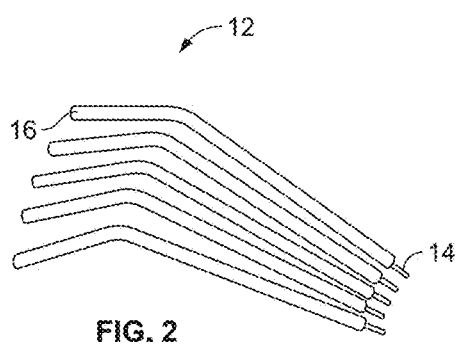
FIG. 2
(Prior Art)
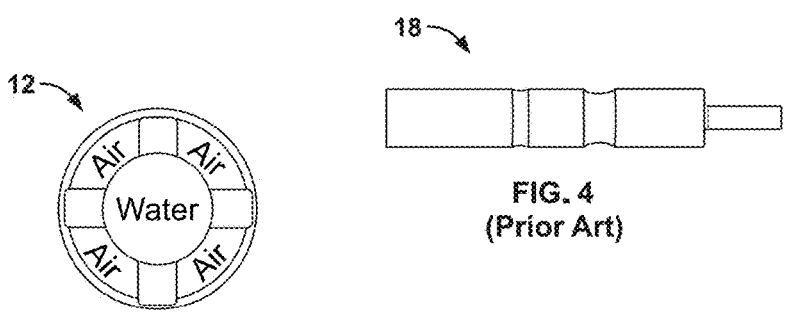
FIG. 3
(Prior Art)
FIG. 4
(Prior Art)

| | | User Needs |
|---|---|---|
| Air-only | Dentist | Dry tooth/teeth before sealant procedures |
| | | Dry tooth for crown placement |
| | Hygienist | Dry tooth during exam for better visibility, particularly for caries detection |
| | | Dry tooth during scaling to reveal calculus under saliva |
| | | Determine sensitivity of tooth |
| | | Check for cracks in tooth |
| | | Eliminate moisture during sealant procedures |
| | | Dry calculus for removal |
| | | Dry previous restorations to check for openings |
| | | Visualize cement after braces/crown removal |
| Air-water | Dentist | Remove debris to enhance visibility |
| | | Remove acid etch chemicals |
| | | Clean cavity to prepare for filling |
| | Hygienist | Rinse prophy paste off teeth after polishing (after water-only) |
| | | Rinse blood off teeth after scaling (after water-only) |
| | | Remove floating calculus |
| Water-only | Dentist | Cool work site during restorative procedures |
| | | Remove acid etch chemicals |
| | | Lubricating mouth for patients with low saliva |
| | Hygienist | Rinse prophy paste off teeth after polishing (before air-water) |
| | | Rinse blood off teeth after scaling (before air-water) |
| | | Remove debris |
| | | Wetting dentures/retainers before putting back in mouth after cleaning |
| | | Rinse gel/bleach after whitening procedure |

FIG. 5

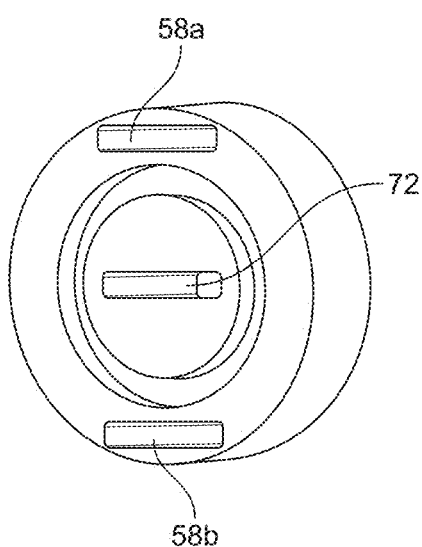
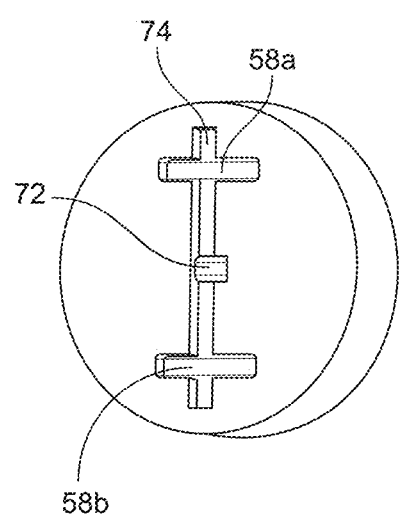
FIG. 20A
FIG. 20B

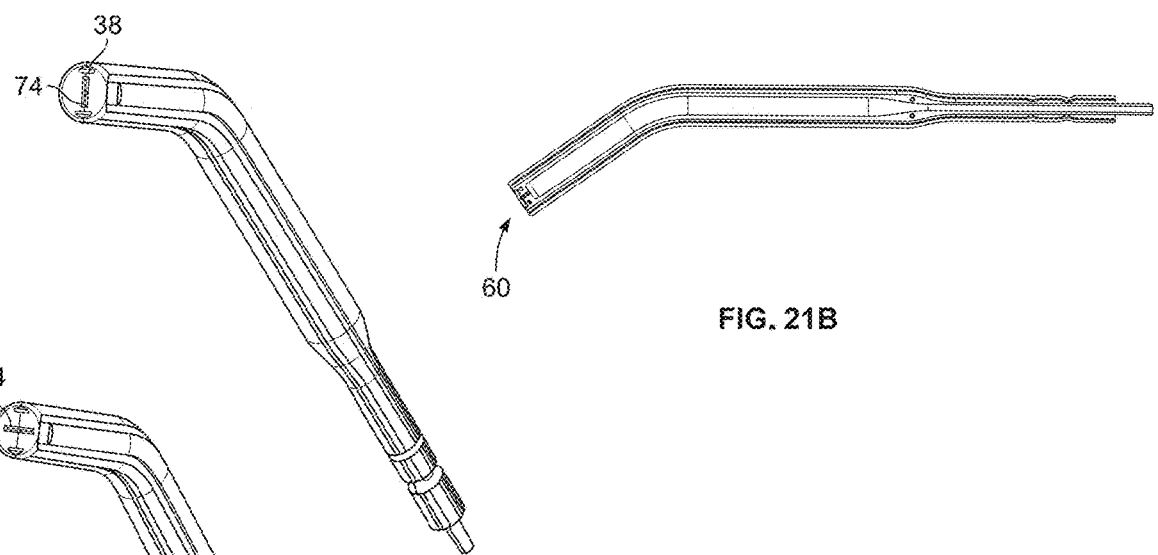
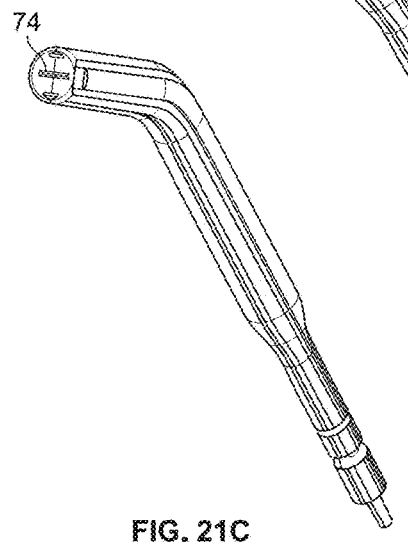
FIG. 21A
FIG. 21B
FIG. 21C
FIG. 21D

| Code | Feed Height | Feed Width | D Max | D Min | Dh | Tube Length | Experimental Rank Sheet Length | Experimental Rank Sheet Width | Conditioning Parameter Rank | Conditioning Parameter | Code |
|---|---|---|---|---|---|---|---|---|---|---|---|
| 3-15-C | 2.0 | 0.3 | 3.0 | 3.0 | 3.0 | 15 | 6 | 6 | 6 | 1.9 | 3-15-C |
| 3-25-C | 2.0 | 0.3 | 3.0 | 3.0 | 3.0 | 25 | 1 | 1 | 4 | 3.1 | 3-25-C |
| 2-15-C | 2.0 | 0.3 | 2.2 | 2.2 | 2.2 | 15 | | | 8 | 0.7 | 2-15-C |
| 2-25-C | 2.0 | 0.3 | 2.2 | 2.2 | 2.2 | 25 | | | 7 | 1.2 | 2-25-C |
| 3-15-O | 2.0 | 0.3 | 3.0 | 1.5 | 2.0 | 15 | 5 | 4 | 2 | 6.3 | 3-15-O |
| 3-25-O | 2.0 | 0.3 | 3.0 | 1.5 | 2.0 | 25 | 2 | 2 | 1 | 10.4 | 3-25-O |
| 2-15-O | 2.0 | 0.3 | 2.2 | 1.2 | 1.6 | 15 | 4 | 5 | 5 | 2.1 | 2-15-O |
| 2-25-O | 2.0 | 0.3 | 2.2 | 1.2 | 1.6 | 25 | 3 | 3 | 3 | 3.6 | 2-25-O |

FIG. 30

DUAL SPRAY NOZZLE TIP ASSEMBLY

CROSS REFERENCE TO RELATED APPLICATIONS

This application claims priority to and the benefit of U.S. Provisional Patent Application No. 62/816,321 filed on Mar. 11, 2019 and titled, "AIR/WATER SYRINGE TIP" and U.S. Provisional Patent Application No. 62/859,393 filed on Jun. 10, 2019 and titled, "AIR/WATER SYRINGE TIP" which are incorporated herein in their entireties.

FIELD OF THE INVENTION

The present invention is directed to the field of a nozzle apparatus, and in particular, for tips for use with nozzle related handpieces in the dental, plumbing, medical, electronic, grooming, or processing fields.

BACKGROUND

Illustrated is a nozzle handpiece or air/water syringe device 10 as shown in FIGS. 1-4 that may be used in the dental field. Air/water syringe 10 is connected to a distal end 14 of a tip or air/water syringe tip 12 ("AWST") for conveying feed water and/or feed air from air/water syringe 10 through distal end 14, then through respective inner and outer lumens or channels (FIGS. 2-3) of air/water syringe tip 12, wherein the feedwater and/or feed air is directed through a proximal end 16 of air/water syringe tip 12. Air/water syringe tip 12 may be adapted for multiple use, such as being constructed of more durable materials, such as metal, or disposable or one-time use, such as being constructed of less durable materials, such as plastic, sometimes referred to as a disposable air/water syringe tip ("DAWST"). For purposes herein, the term "tip", "air/water syringe tip" and the like is intended to refer to both multiple use and one-time use applications. For purposes of uniformity, as shown in FIG. 4, tips 12 include an interfacing geometry 18 that is adapted to be received by air/water syringe 10.

In a non-exclusive embodiment, as shown in FIG. 5, the needs of dental professionals while utilizing air/water syringe 10 varies depending upon the type of dental procedure, i.e., air-only, air-water, and water-only. However, irrespective of the type of dental procedure, conventional air/water syringe tips 12 only provide a stream with relatively large velocity and potentially turbulent flow, in which the stream undergoes irregular fluctuations or mixing, and being subject to continuous changes in speed at a given position of the flow stream in both magnitude and direction. The only available adjustment mechanism is pressure variance. This flow arrangement results in a geometry having a narrow surface coverage, and significant splatter and aerosol (i.e., suspended droplets entrained in the flow stream). Notably, FIG. 5 is a table that lists various needs in the dental field. However, various applications for air and fluid mix may also be applicable to the plumbing, medical, electronic, grooming, or processing fields.

It would be desirable in the art to have an air/water syringe tip having a geometry that provides increased, uniform flow control, which flow providing increased surface area coverage, as well as having reduced splatter and aerosol for various fields of use.

SUMMARY

Accordingly, it is an object of the present disclosure to overcome the above mentioned difficulties by providing a nozzle tip assembly having a geometry that is split into several sub components to enable robust molding and assembly of the resulting nozzle. The method of making the nozzle tip assembly includes forming two molds configured to form separate halves of the nozzle. Optionally, forming an insert member or piece to be assembled within the nozzle halves. The step of forming the molds having a cup shaped piece containing nozzle geometry, forming or extruding a separate lumen having an interface for a handpiece. The handpiece may be configured to provide pressurized fluid, gas or both. The pieces may be formed by extruding an interior lumen for providing a liquid such as water and also an exterior shell encasing formed by molding or extrusion. The two halves or resultant pieces may then be joined together along edges to form an interior lumen aligned generally along a central axis of the nozzle pieces and an at least one exterior lumen positioned above and/or below the first lumen.

In an embodiment, provided is a dual spray nozzle tip assembly configured to be attached to a device configured to provide at least one of a pressurized fluid and gas comprising an elongated body defining a fluid lumen and at least one gas lumen between a distal end and a proximal end. The elongated body including at least an attachment profile provided along the distal end, a straight portion, and an outlet region provided along the proximal end. The outlet region defines a shear nozzle in communication with the fluid lumen and at least one gas outlet in communication with the at least one gas lumen, said shear nozzle and at least one gas outlet are positioned along the proximal end wherein the outlet region is configured to direct pressurized gas from the at least one gas outlet and to produce a fluid spray of a desired spray pattern from the shear nozzle. Said shear nozzle may include a fluid outlet and a recess that provides space for spray pattern formulation upon pressurized fluid exiting the fluid lumen. The fluid outlet may be recessed from alignment relative to the one or more gas outlets along the proximal end. The recess includes an elongated profile having a major axis that extends toward the one or more gas outlets and a minor axis extending perpendicular relative to said major axis wherein said recess extends through a center portion of said shear nozzle and extends along said major axis in a vertical arrangement. The recess may extend through the one or more gas outlets. Alternatively, the recess includes an elongated profile having a major axis that extends generally parallel to a major axis of the one or more gas lumens wherein said recess extends through a center portion of said shear nozzle and extends along said major axis in a horizontal arrangement. The elongated body may include two gas lumens positioned eccentrically or outboard from the fluid lumen.

In a further embodiment, said elongate body may include an elongated cylindrical shape defined by a first member and a second member shaped to be attached to one another along inner surfaces to form the fluid lumen and the at least one gas lumen to allow for the transfer of a fluid as well as separately allow for the transfer of gas therein. At least one of the first member and the second member may include an outer surface shape having at least one flat portion formed along said outer surface, said flat portion is shaped to include an elongated groove that is formed at least partially along the length of the elongated body. The at least one flat portion may be formed along the entire length of the first member or second member and wherein the first member may be attached to the second member by welding. The first member may be made from a transmissive material and the second member may be made of an absorptive material wherein the at least one flat portion is configured to permit an energy source to pass through transmissive material in the first member to reach and achieve a welding joint between the first and second members along the length of the elongated body. The welding joint may be formed along or in close proximity to edges of said fluid lumen and the one or more gas lumen along the interfacing contact surfaces of the first and second members. Their may be four elongated flat portions formed along the length of the first member and positioned to complement a portion of an inner surface of the first member that may be welded to an inner surface of the second member to also define the lumens therein. The one or more gas lumens and gas outlets may straddle a weld joint between the first member and the second member.

The shear nozzle may include a pair of converging channels that extend from an inner surface of a converging region of the fluid lumen to the fluid outlet aligned within a recess, wherein the converging channels are configured to receive fluid from the fluid lumen and cause fluid jets to impinge at the fluid outlet and migrate along the recess to form the fluid spray pattern distributed therefrom. The converging channels may be slightly curved to produce converging jets of fluid therein. The elongated body of the nozzle tip assembly may include a widening transition portion and a bend portion positioned along the length of the elongated body between the straight portion and the outlet region. The bend portion may include an acute bend angle in the range between about 0° degrees to about 60° degrees and more particularly about 35° relative to the proximal end and the distal end of the nozzle tip assembly.

In another embodiment, provided is a method of manufacturing a dual spray nozzle tip assembly comprising the step of forming a first member and a second member each having a portion of a shear nozzle geometry, a portion of a center lumen and a portion of at least one exterior lumen spaced from the center lumen with an attachment interface surface. The first member may be aligned to the second member to define the center lumen and at least one gas lumen along the length of the first member and second member. The first member may be joined to the second member along the attachment interface surfaces wherein once joined, the first member and the second member define an elongated body having an attachment profile configured to be attached to a device for providing pressurized fluid or gas, a transition portion, a straight portion, a bend portion, and an outlet region wherein said interior lumen is aligned generally along a central axis of the elongated body and at least one exterior lumen positioned above and/or below the first lumen. The outlet region may define a shear nozzle and at least one gas outlet configured to direct pressurized gas from the at least one gas outlet and to produce a fluid spray of a desired pattern from the shear nozzle. The step of forming a first member comprises forming at least one flat portion along a length of the first member along an outer surface opposite from said portion of said center lumen and at least one exterior lumen. The step of joining said first member to said second member further comprises applying an energy source along the at least one flat portion to weld the attachment interface surfaces of the first and second members together.

BRIEF DESCRIPTION OF THE DRAWINGS

The operation of the present disclosure may be better understood by reference to the following detailed description taken in connection with the following illustrations, wherein:

FIG. 1 is a perspective view of an air/water syringe device known in the prior art;

FIG. 2 is a perspective view of air/water syringe tips known in the prior art to be used with the air/water syringe device of FIG. 1;

FIG. 3 is a schematic cross sectional view of a portion of the syringe tip of FIG. 2;

FIG. 4 is a plan view of a portion of the syringe tip of FIG. 2;

FIG. 5 is a table that identifies dental practitioner various needs for the air water syringe device in the dental field;

FIG. 20A is a perspective view of an embodiment of an outlet portion of the nozzle tip assembly;

FIG. 20B is a perspective view of an embodiment of an outlet portion of the nozzle tip assembly;

FIG. 21A is a perspective view of an embodiment of the nozzle tip assembly with a vertical spray outlet channel;

FIG. 21B is a cross sectional view of an embodiment of the nozzle tip assembly with a vertical spray outlet channel;

FIG. 21C is a perspective view of an embodiment of the nozzle tip assembly with a horizontal spray outlet channel;

FIG. 21D is a cross sectional view of an embodiment of the nozzle tip assembly with a horizontal spray outlet channel;

FIG. 30 is a table illustrating data relating to performance of various embodiments of the nozzle tip assembly;

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Figure 6:
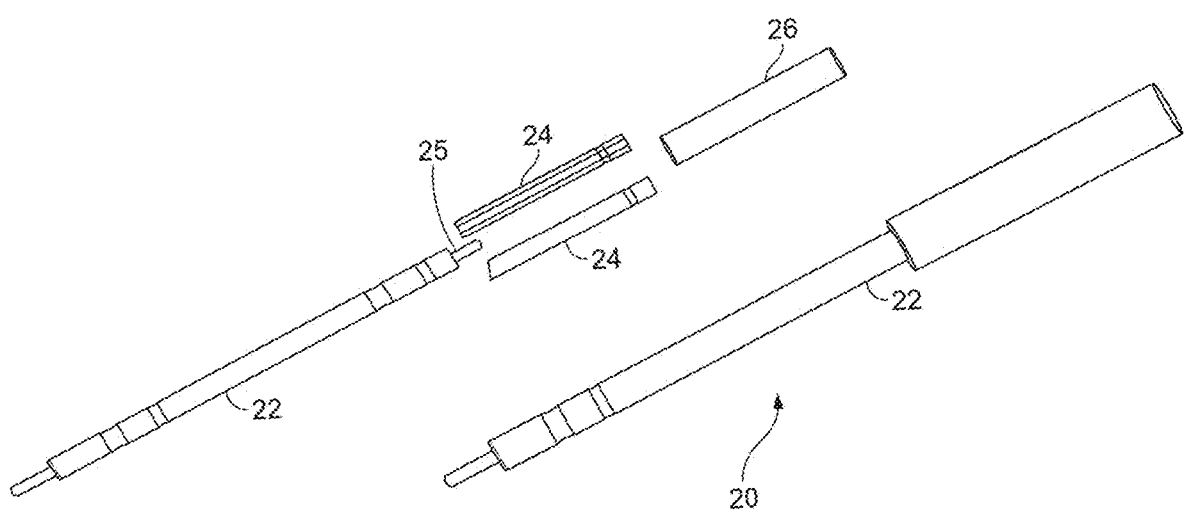
FIG. 6 is an exploded view of an embodiment of a nozzle tip assembly of the instant disclosure.

The present invention provides an dual spray nozzle tip assembly 20 ("nozzle tip assembly") having an elongated body having a geometry that provides increased, uniform flow control, which flow providing increased surface area coverage, as well as having reduced splatter and aerosol. In one embodiment, such as shown in FIG. 6, the nozzle tip assembly 20 may include an elongated body that includes a conventional tip portion 22 and two nozzle halves 24 secured over a proximal end 25 of tip portion 22 that are compressed together by a sleeve 26 that slides over and compresses the two nozzle halves 24 together, the two nozzle halves 24 forming the air channels or outer lumen of the tip. The portions of the nozzle tip assembly 20 may be made of disposable materials or more permanent reusable materials. The tip portion 22 may be comparable to a attachment profile section 40 while the two nozzle halves 24 may be comparable to first and second members 32a, 32b as described below that are attached to define at least a fluid lumen and a gas lumen when attached to also include a nozzle geometry formed therein to produce a desired fluid spray pattern. The nozzle tip assembly 20 embodiment includes separate pieces attachable to allow for fluid and gas to flow therein from a device such as an air/water syringe 10.

Figure 8:
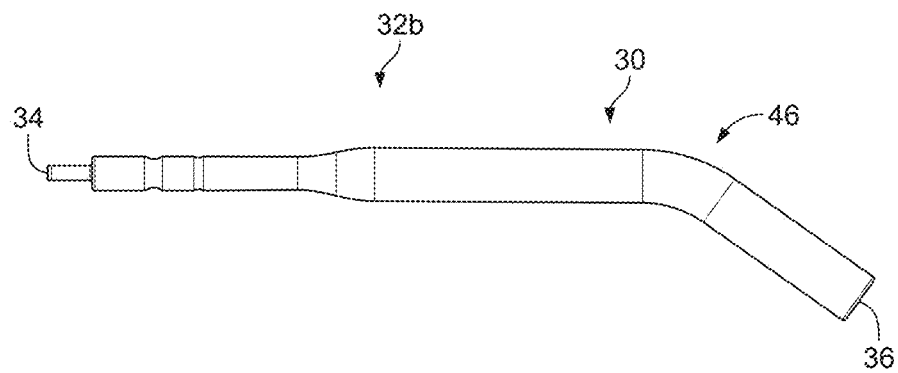
FIG. 8 is a side view of an embodiment of the nozzle tip assembly of the instant disclosure.
Figure 9:
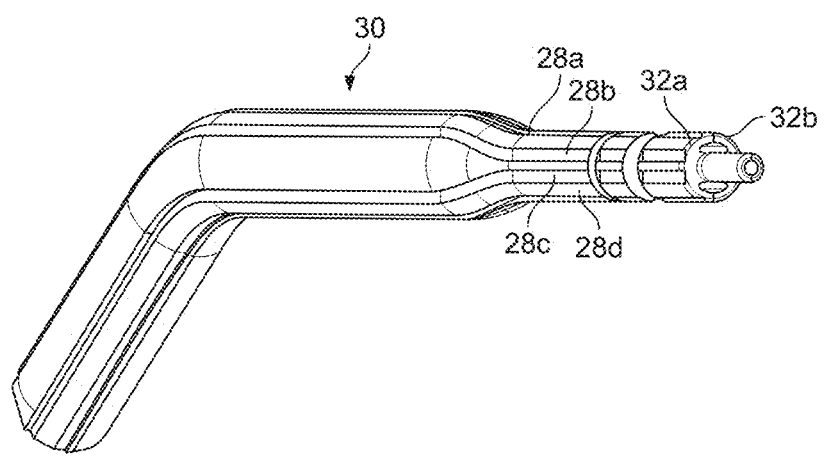
FIG. 9 is a perspective view of an embodiment of the nozzle tip assembly of the instant disclosure.

As shown in FIGS. 7-36, provided is another embodiment of the dual spray nozzle tip assembly 30. Here, the nozzle tip assembly 30 includes an elongated body that may be comprised of an opposed first member 32a and second member 32b (FIG. 9). As further shown in FIGS. 7-8, at least one of the first and second members 32a, 32b may be shaped to form a plurality of lumens therein to allow for the transfer of a fluid, such as water, as well as separately allow for the transfer of gas, such as air. The nozzle tip assembly 30 may include an elongated cylindrical shape configured to be attached to a device, such as an air/water syringe nozzle 10, or other such device configured to provide a supply of pressurized fluid and gas. The first member 32a and the second member 32b may be considered "half(ves)" of the nozzle tip assembly and be configured to be joined to one another and form the plurality of inner lumens therein having a particular shape to assist with the transfer of fluid and gas therein.

The at least one of the first and second members 32A, 32B of the nozzle tip assembly 30 may include an outer perimeter shape having at least one flat portion 28. Flat portions 28 may be formed in the outer periphery of either or both of the first member 32a and the second member 32b. The flat portion 28 may be an elongated divot or groove that is formed at least partially along the length of the nozzle tip assembly 30. In an embodiment, the flat portion 28 may be formed along the entire length of the first or second members 32a, 32b.

Figure 7:
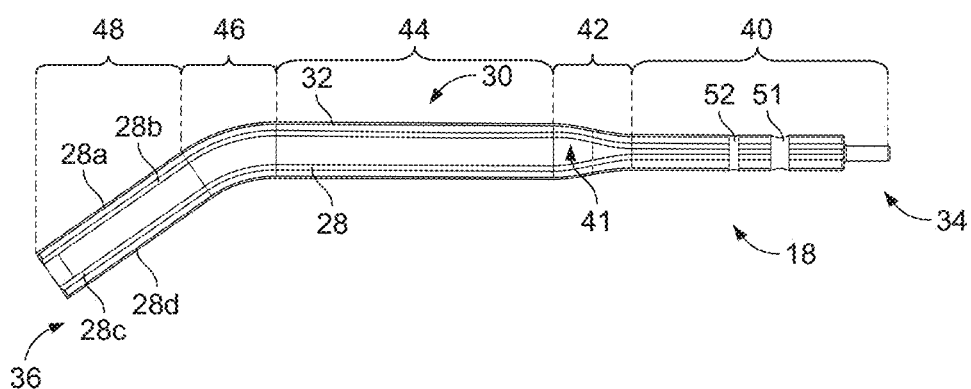
FIG. 7 is a cross sectional side view of an embodiment of the nozzle tip assembly of the instant disclosure.

In an embodiment, the first member 32A may be joined to the second member 32b by welding. For example, a laser beam or other energy source may be applied to the join the pair of members 32a, 32b that have been brought together, the laser beam passes through the flat portions 28 defined within the first member 32a (FIG. 7) to reach and achieve a welding joint 37 with the corresponding second member 32b (FIG. 8). As better shown in FIGS. 9 and 10, the first member 32a may be formed of a transmissive material and the second member 32*b* may be formed of an absorptive material. As such, flat portions 28 may permit a laser beam to pass through transmissive material in the first member 32*a* with minimal reflection and refraction to reach and achieve the welding joints 37 between the first and second members 32*a*, 32*b*. The joints 37 may be formed along or in close proximity to or with each edge of a fluid lumen or channel 50 and each edge of the one or more gas lumen or channels 38*a*, 38*b* along the interfacing contact surface 33*a*, 33*b* of contacting first and second members 32*a*, 32*b*. In an embodiment as illustrated by FIG. 7, the nozzle tip assembly 30 may include four elongated flat portions 28 along the length of the first member 32*a*. Each of the flat portions 28 may be formed to complement a portion of an inner surface 33*a* of the first member 32*a* that is to be welded to an inner surface 33*b* of the second member 32*b* to also define the lumens therein. This may provide hermetic seal or attachment between the first member 32*a* and the second member 32*b* to allow the lumens to be formed therein having a portion of the fluid lumen 50 and the at least one gas lumen 38*a*, 38*b* being defined within the first member 32*a* and a portion of the fluid lumen 50 and the at least one gas lumen 38*a*, 38*b* being defined within the second member 32*b*.

Figure 18A:
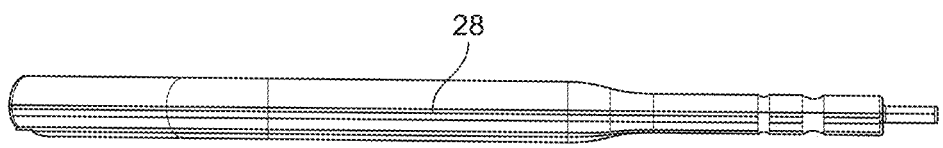
FIG. 18A is a side view of an embodiment of the nozzle tip assembly with a flat portion along a side thereof.
Figure 18B:
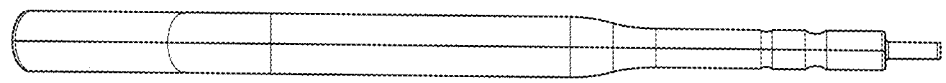
FIG. 18B is a side view of an embodiment of the nozzle tip assembly without flat portions along the side thereof.
Figure 18C:
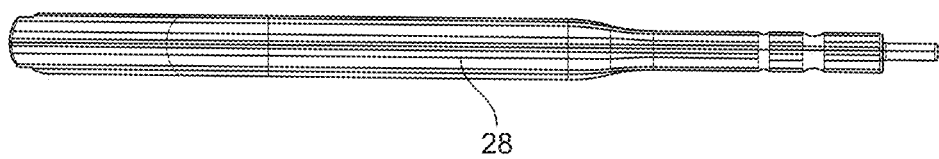
FIG. 18C is a side view of an embodiment of the nozzle tip assembly with a plurality of flat portions along the perimeter.

During operation, fluid, such as water, may be constrained to flow in fluid lumen 50, and gas, such as feed air, may be constrained to flow in each of the one or more gas lumens 38*a*, 38*b*. That is, fluid and gas do not mix within the first and second members 32*a*, 32*b* when attached together as both flow from a distal end 34 to proximal end 36 of the nozzle tip assembly 30. In one embodiment, such as shown in FIG. 8, four flat portions 28*a*, 28*b*, 28*c*, 28*d* are formed in at least one of the first member 32*a* or the second member 32*b*. Flat portion 28*a* may be positioned along the length of the first member 32*a* and may be generally parallel to, spaced from, and adjacent to flat portion 28*b*. Flat portion 28*b* may be positioned along the length of the first member 32*a* and may be generally parallel to, spaced from, and adjacent to flat portion 28*c*. Flat portion 28*c* may be positioned along the length of the first member 32*a* and may be generally parallel to, spaced from, and adjacent to flat portion 28*d*. Flat portions 28*a* and 28*b* may be positioned along portions that are to be welded or attached therein to define a first or upper gas lumen 38*a*. Flat portions 28*b* and 28*c* may be positioned along portions that are to be welded or attached therein to define the fluid lumen 50. Flat portions 28*c* and 28*d* may be positioned along portions that are to be welded or attached therein to define a second or lower gas lumen 38*b*. However, in other embodiments, the number of flat portions 28 formed in one or both of first or second members 32*a*, 32*b* may be different than four, such as zero for a transmissive member, or zero for both members (See FIG. 18A for one-sided flat portions). In one embodiment, flat portions 28 are formed by the removal of material from the periphery of the members 32. Alternatively, the flat portions 28 may be formed by the addition of material to the periphery of members 32. In an embodiment, the absorptive member 32*b* may include a smooth outer perimeter, as shown by FIG. 9 and FIG. 18B or may have flat portions 28 for aesthetic symmetric with the transmissive member as shown by FIG. 18C.

As illustrated by FIG. 7, the nozzle tip assembly 30 has a generally cylindrical shaped outer profile that includes an attachment profile 40 along portions of its length adjacent to the distal end 34. The attachment profile 40 may define at least one gas inlet 35*a*, 35*b* and a fluid inlet 39 to receive pressurized gas and fluid from the device respectively. The attachment profile 40 may include at least one groove 51 that may be formed about the periphery and be able to selectively interface with the device for providing pressurized fluid or gas such as an air water syringe 10. The groove 51 may be configured to selectively abut against an O-ring or other such type of retaining member as may be provided with the device for providing pressurized fluid or gas. An indicator 52 may be provided along the attachment profile 40 to serve as a visual indicator for a user to sufficiently connect the nozzle tip assembly 30 correctly to the device wherein such indicator 52 would signal to the user proper alignment with a portion of the device once correctly attached. Along the length of the nozzle tip assembly 30 may include a widening transition portion 42 in which the geometry of the assemble transitions from a generally slender shape to a widened shape along the length of the assembly. A straight portion 44 may be positioned after the transition portion 42. In an embodiment, a bend portion 46 may be positioned along the length of the assembly after the straight portion 44. An outlet region 48 may be positioned after the bend portion 46 or may be positioned directly after the straight portion 44. The outlet region 48 may be adjacent to the proximal end 36.

In one embodiment, the bend portion 46 may include an acute bend angle, for example about 35° between opposed ends 34, 36 of the nozzle tip assembly 30. The bend portion 46 may provide improved access to the area of application during use such as a sensor surface to be cleaned or within an oral cavity of a dental patient. In other embodiments, any different bend angles may be utilized between a maximum acute bend angle of about 60° to a bend angle of about 0° (FIG. 17B), which have produced acceptable results during prototyping. Further, it is to be understood, that other methods to join opposed members 32*a*, 32*b* may be utilized, including adhesives or other techniques, such as inducing relative motion of one member relative to another, sometimes referred to as friction welding.

Figure 10:
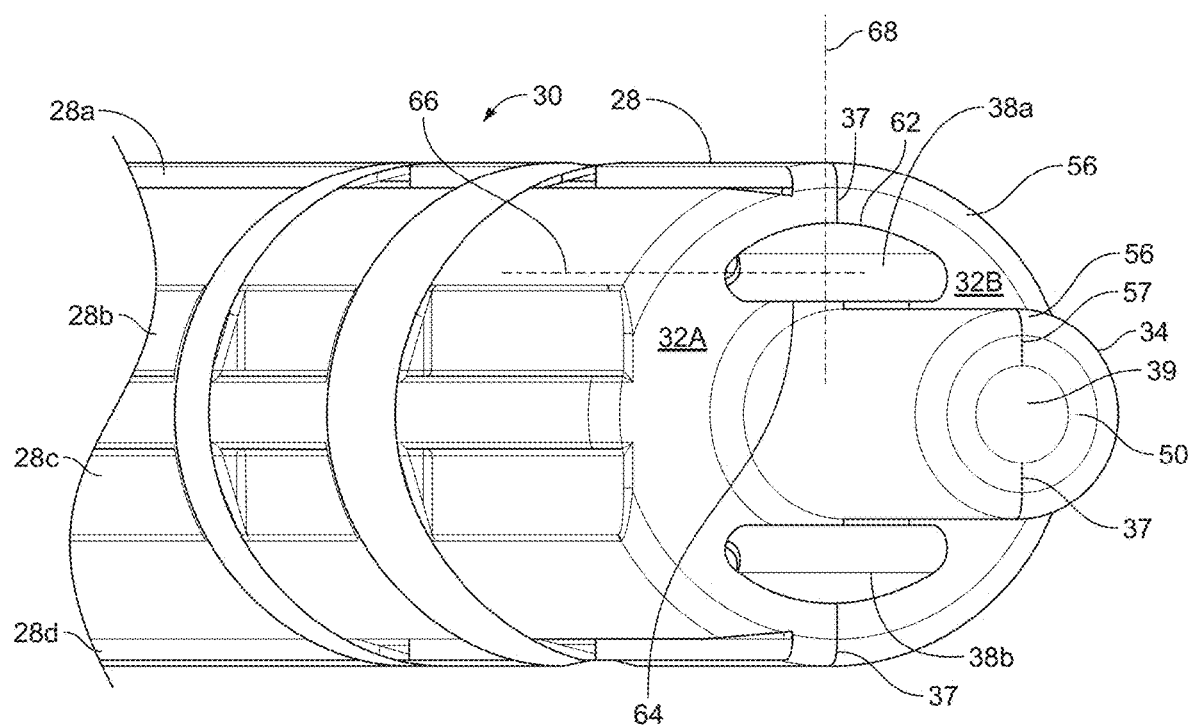
FIG. 10 is an enlarged perspective view of an embodiment of a distal end of the nozzle tip assembly of the instant disclosure.
Figure 11:
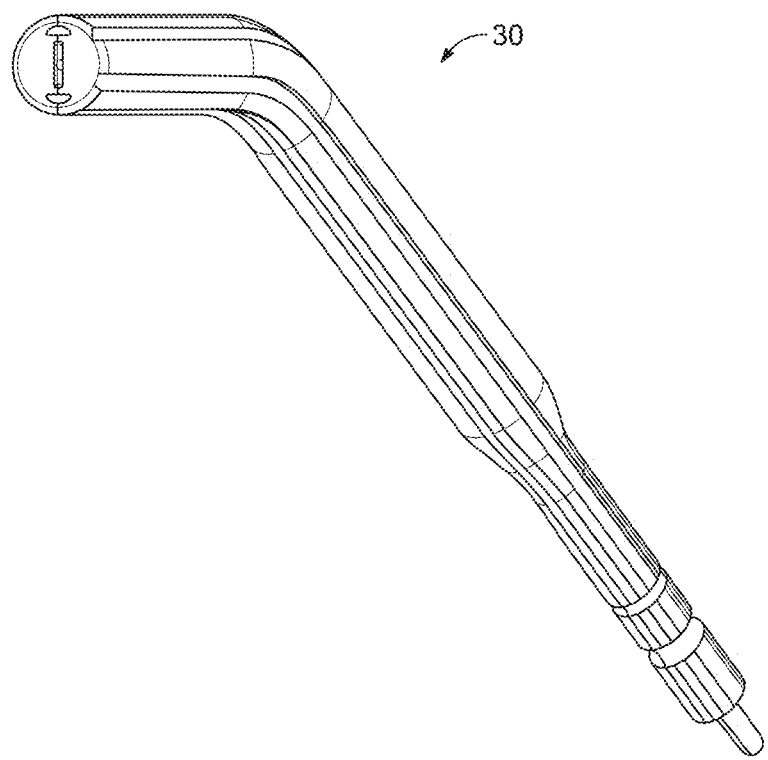
FIG. 11 is a perspective view of an embodiment of the nozzle tip assembly of the instant disclosure.

In one embodiment, as shown in FIG. 10, portions of the nozzle tip assembly 30 may include beveled or rounded edges 56 of distal end 34. The rounded edges 56 may be provided along the attachment portion 40 and insertion portion 57 that is configured to be inserted inside of air/water syringe 10 (FIG. 1) prevent damage to O-rings (not shown) inside of the air/water syringe 10.

Figure 13:
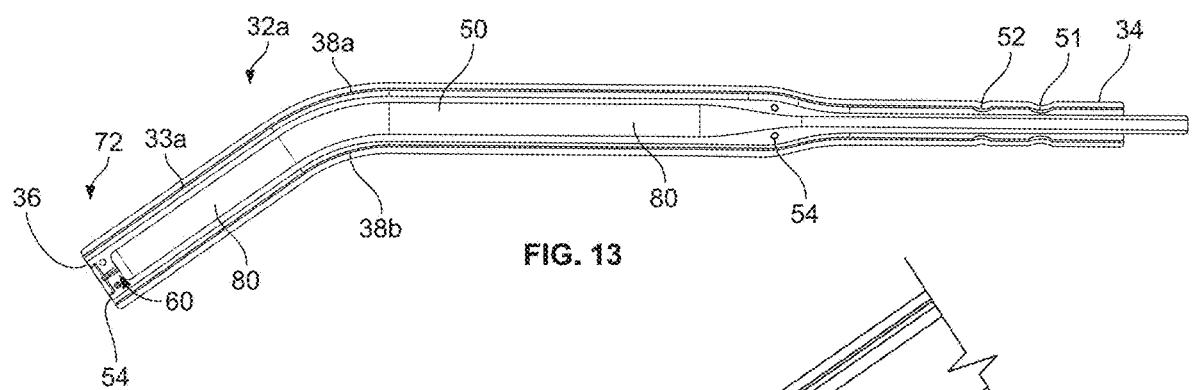
FIG. 13 is a cross sectional view of an embodiment of the nozzle tip assembly of the instant disclosure.
Figure 14:
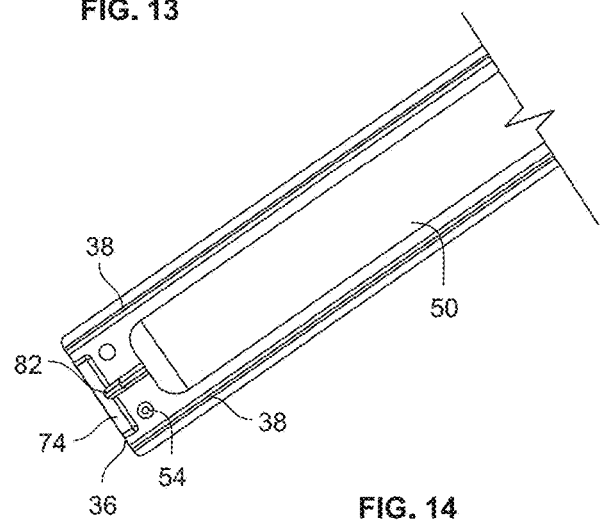
FIG. 14 is an enlarged cross sectional view of an embodiment of a proximal end of the nozzle tip assembly of the instant disclosure.

Other methods of attaching the first member to the second member are contemplated herein. In one embodiment, at least one alignment pin or protrusion 54 such as shown in FIG. 13 may be utilized to help position and secure opposed first and second members 32*a*, 32*b* together prior to welding or attachment with adhesives. In one embodiment about four alignment pins 54 are used and may be positioned in various locations along the first and second members wherein the opposite member may include a hole or depression configured to receive a portion of the alignment pins 54. Alignment pins 54 may be positioned along the widening transition portion 42 along opposing sides of the fluid lumen 50 and may also be positioned along opposite sides of nozzle jets or channels 82 along the outlet region 48.

Referring now collectively to FIGS. 10, 19A, 19B, 19C, 19D, 20A, and 20B, one or more gas lumens or air channels 38*a*, 38*b* may be positioned eccentrically or outboard from generally centered fluid lumen or water channel 50 for directing pressurized air from the device such as an air/water syringe 10 (FIG. 1) or other device configured to provide pressurized fluid and/or gas. In one embodiment, in which a cross-section of the body of the nozzle tip assembly 30 is generally circular, the one or more air channels 38 may be positioned radially outboard from the generally centered water channel 50. In one embodiment, when a pair of gas lumens 38a, 38b are utilized, the pair of gas lumens 38a, 38b may be generally symmetrically positioned relative to centered fluid lumen 50. For a given gas pressure level, as the distance between the one or more gas lumens 38a, 38b and fluid lumen 50 may be reduced, cleaning performance may improve, but additional aerosol or misting may be created. A reduction of the size of gas lumen(s) 38 for a given air pressure level may create higher velocity air, but also creates increased aerosol and delivers less air through the outlet region which may be directed to a working surface such as an oral cavity of a patient.

In one embodiment, gas lumens 38a, 38b may allow air or gas to travel therein and may exit through gas outlets 58a, 58b, respectively. The fluid lumen 50 may allow fluid or water to travel therein and may exit through a fluid outlet 72. In one embodiment, the gas lumens 38a, 38b and respective outlets 58a, 58b may be oriented generally parallel to the fluid lumen 50 and fluid outlet 72. In another embodiment, the one or more gas outlets 58a, 58b may be oriented toward the fluid outlet 72 (FIG. 20B), which may provide improved cleaning performance, but may also create increased aerosol. In one embodiment, gas outlets 58a, 58b are oriented away from the fluid outlet 72, which may create less aerosol, but may also provide decreased cleaning performance. As a result of this interplay between the number, size, shape, location and orientation of the one or more gas lumen 38 with fluid lumen 40, different combinations of these attributes may be utilized depending upon specific applications, such as shown in FIG. 5.

The gas lumen 38 may have a cross sectional shape that appears generally flat and elongated with rounded inner surfaces as illustrated by FIG. 10. In one embodiment, one or more gas lumens 38a, 38b generally resembles a hemisphere having a curved portion 62 facing away from fluid lumen 40, and a generally straight portion 46 adjacent to the fluid lumen 40. As further shown, the one or more gas lumens 38a, 38b includes a major axis 66 extending generally parallel to straight portion 50 and a minor axis 68 radially extending through the center of fluid lumen 40. As further shown in FIG. 10, the one or more gas lumens 38 may be symmetric about minor axis 66. In one embodiment, the one or more gas lumens 38 may be symmetric about major axis 66. In one embodiment, at least one of the one or more gas lumens 38 generally resembles a rectangle with rounded edges.

Figure 19A:
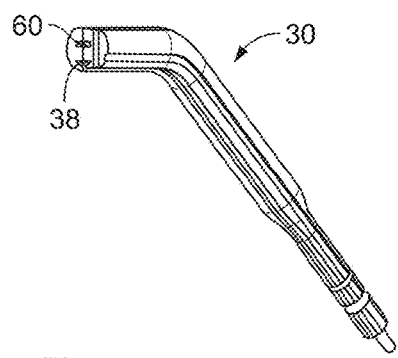
FIG. 19A is a perspective view of an embodiment of the nozzle tip assembly with a single air channel.
Figure 19B:
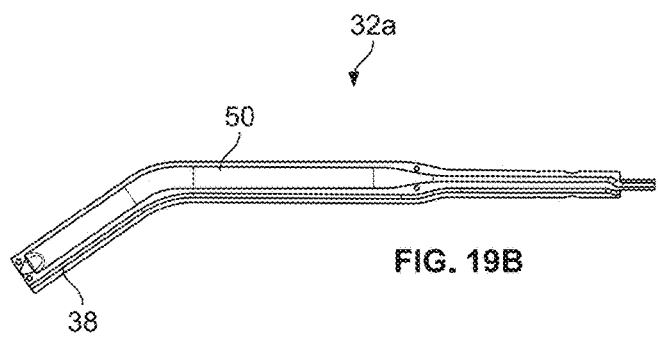
FIG. 19B is a cross sectional view of an embodiment of the nozzle tip assembly with a single air channel.

In one embodiment, as shown in FIG. 19A, having a single gas lumen 38a permits ease of manufacturing due to increased wall thickness, and also creates increased velocity air flow compared to a pair of gas lumens 38a, 38b but also creates increased aerosol and delivers a decreased airflow to the application area such as an oral cavity of a patient.

Figure 12:
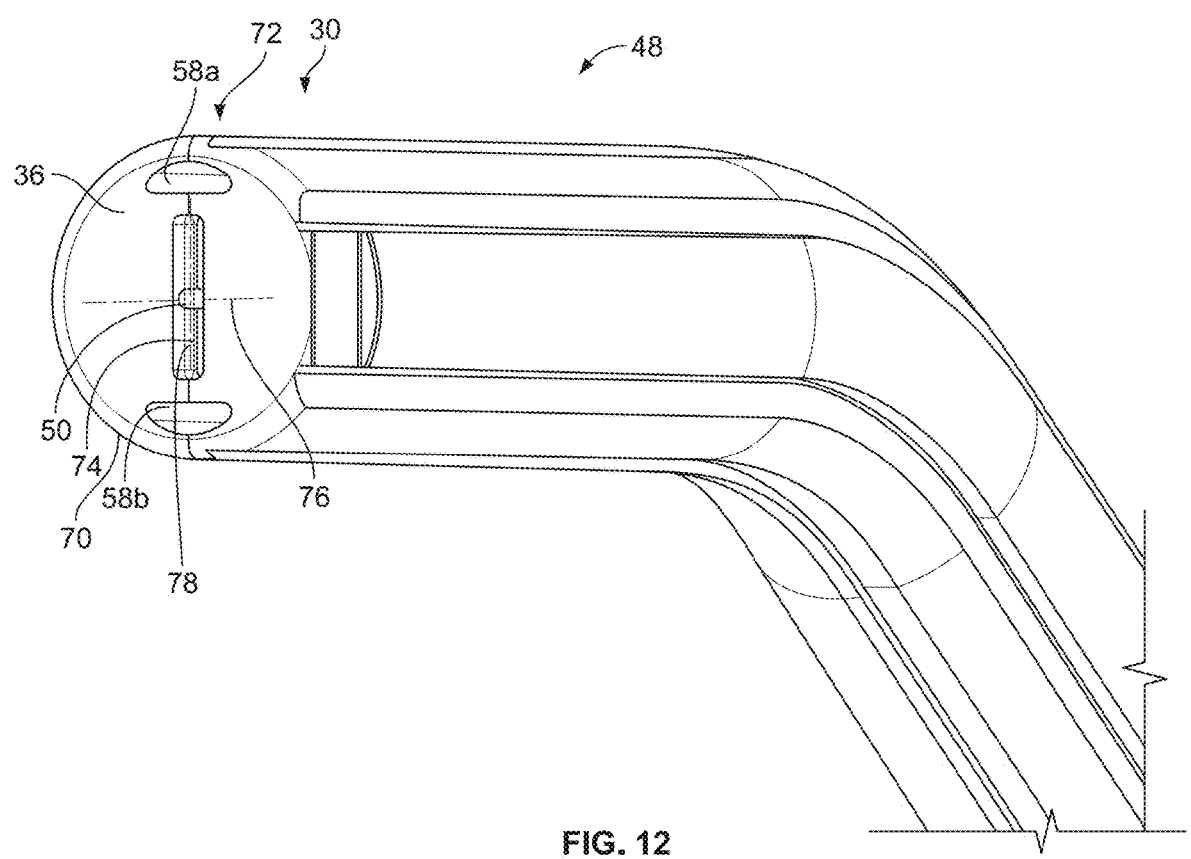
FIG. 12 is an enlarged perspective view of an embodiment of a proximal end of the nozzle tip assembly of the instant disclosure.

FIG. 12 shows an enlarged front-left view of proximal end 36 of an embodiment of the nozzle tip assembly 30. Proximal end 36 includes a beveled or rounded peripheral edge 70 for preventing irritation of oral mucosa.

Figure 19C:
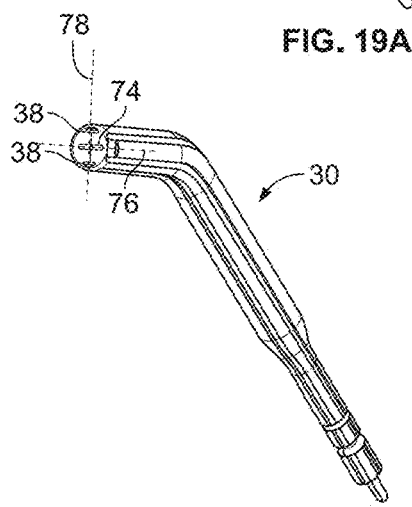
FIG. 19C is a perspective view of an embodiment of the nozzle tip assembly with two air channels.
Figure 19D:
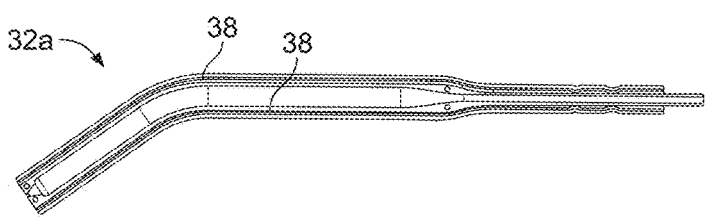
FIG. 19D is a cross sectional view of an embodiment of the nozzle tip assembly with two air channels.
Figure 22A:
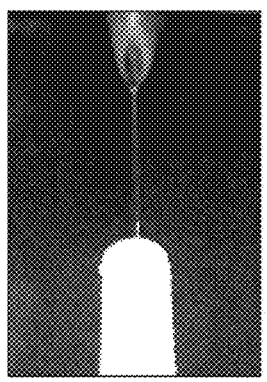
FIG. 22A is a top view of a spray of fluid from an embodiment of the nozzle tip assembly with a vertical spray outlet channel.
Figure 22B:
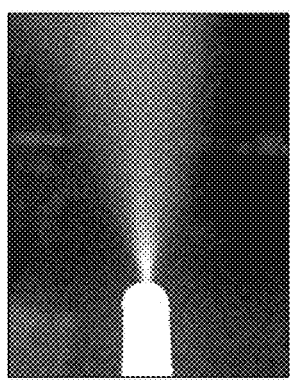
FIG. 22B is a top view of a spray of fluid and air from an embodiment of the nozzle tip assembly with a vertical spray outlet channel.

As shown collectively in FIGS. 12, 19A, 19B, 19C, 19D, 20A, and 20B proximal end 36 includes an outlet region 46 that includes a shear nozzle 60 having a fluid outlet 72 and a relief cut or recess 74 that provides space for spray pattern formulation upon pressurized water or fluid exiting the fluid channel 50. As a result of fluid outlet 72 being recessed behind or upstream of the one or more gas outlets 58a, 58b in communication with the gas lumens 38 relative to proximal end 36, as shown in FIG. 13, improved air-water or gas-fluid separation is provided. As shown in FIG. 12, recess 74 includes a major axis 78 that extends toward the one or more air channels 38, defining for purposes herein as a "vertical" arrangement or orientation, with recess 74 further having a minor axis 76 extending perpendicular to major axis 78 or parallel to major axis 66 (FIG. 10) of the one or more air channels 38 and extending through a center portion of nozzle 60. As shown in FIG. 19C, recess 74, for purposes herein, defines a "horizontal" arrangement or orientation with major axis 78 of recess 74 extending parallel to major axis 66 (FIG. 10) of the one or more air channels 38 and minor axis 76 extending perpendicular to major axis 78 and perpendicular to major axis 66 (FIG. 10) of the one or more air channels 38. In one embodiment, such as shown in FIG. 20B, recess 74 extends through the one or more air channels 38.

Figure 23A:
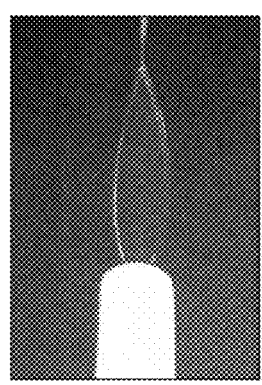
FIG. 23A is a top view of a spray of fluid from an embodiment of the nozzle tip assembly with a horizontal spray outlet channel.
Figure 23B:
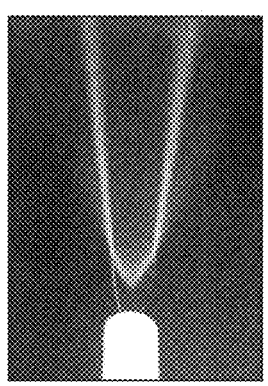
FIG. 23B is a spray of fluid and air from an embodiment of the nozzle tip assembly with a horizontal spray outlet channel.

As shown collectively in FIGS. 21A, 21B, 21C, 21D, 22A, 22B, 23A, 23B, the horizontal arrangement or orientation creates a corresponding horizontal spray by rotating nozzle 60 and recess 74 about 90° relative to the one or more gas outlets 58a, 58b. In one embodiment, the one or more gas lumens 38a, 38b and gas outlets 58a, 58b cannot be rotated, as they must straddle the weld joints 37 to be moldable and allow the first and second members 28a, 28b to be attachable. Therefore, the horizontal spray also creates a different gas-fluid spray pattern, such as shown in FIGS. 23A, 23B. The spray has been heavily tested with both horizontal and vertical orientations, with generally little difference between them. Vertical water spray (FIGS. 22A, 22B) is preferred due to ease of manufacturing. For gas-fluid spray, the horizontal spray creates a flat sheet, while the vertical spray creates a cone spray that is comparatively softer and more gentle. Stated another way, vertical gas-fluid spray is preferred due to lower aerosol and splatter.

Figure 15:
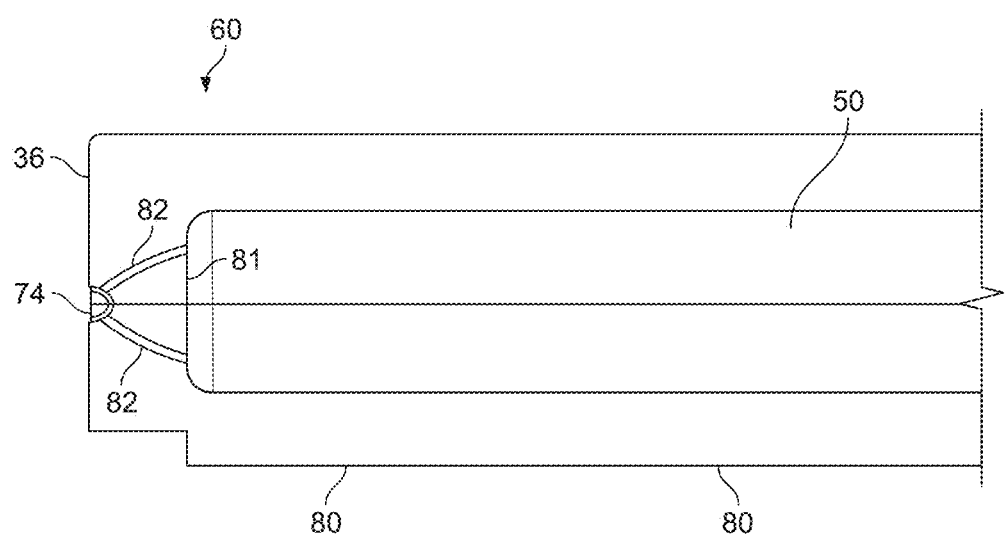
FIG. 15 is an enlarged cross sectional view of an embodiment of a proximal end of the nozzle tip assembly of the instant disclosure.
Figure 16:
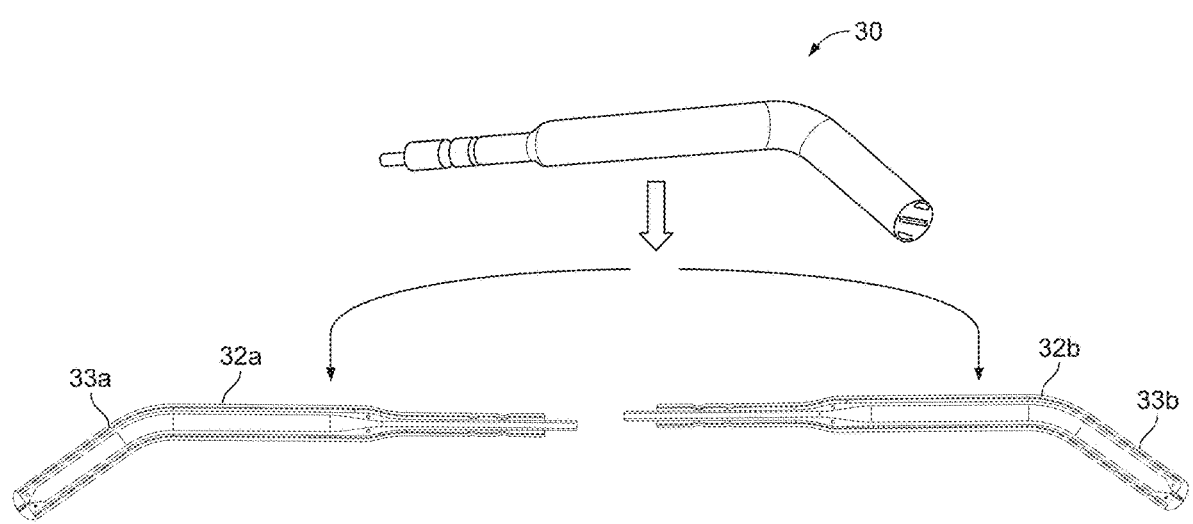
FIG. 16 is a schematic view of an embodiment of the nozzle tip assembly in an assembled and disassembled configuration.
Figures 17A, 17B:
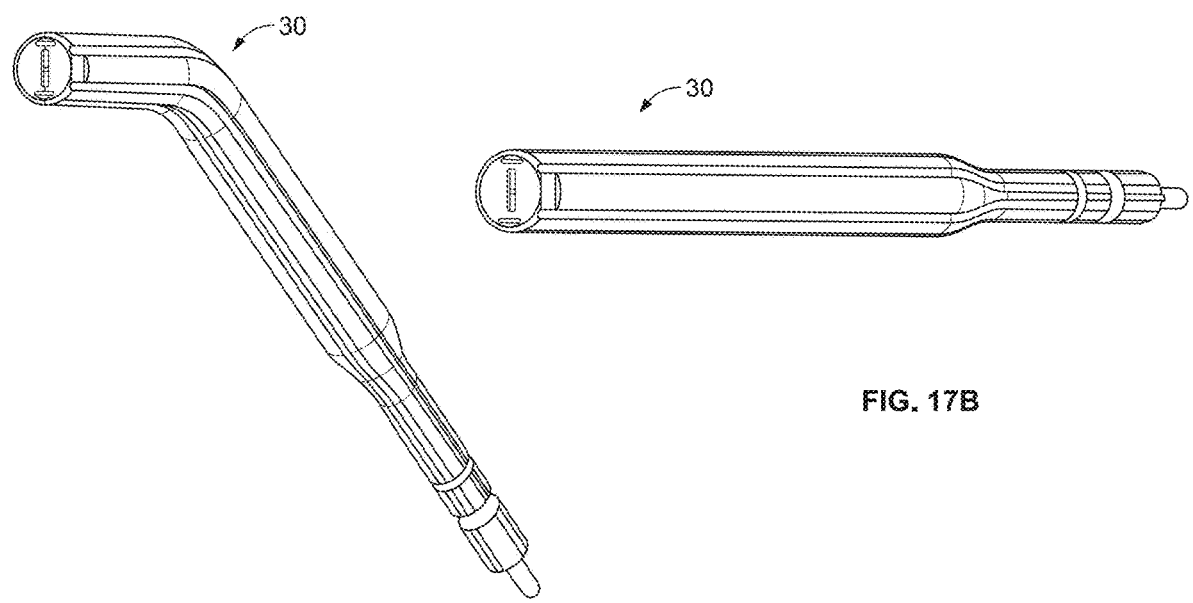
FIG. 17A is a perspective view of a bent embodiment of the nozzle tip assembly of the instant discloser.
FIG. 17B is a perspective view of a straight embodiment of the nozzle tip assembly of the instant disclosure.

As shown collectively in FIGS. 13, 15, and 33-36, fluid lumen 50 defines a conditioning region 80 having smooth transition regions that discourage flow separation and strong velocity gradients, thereby limiting frictional losses and highly turbulent flow entering nozzle 60. As shown in FIG. 15, nozzle 60 includes a pair of converging channels 82 that in combination with other features provides the beneficial spray pattern disclosed herein, such as in FIGS. 27-28. The conditioning region 80 may extend from the transition portion 42 to the outlet region 48 and ensure that pressurized fluid therein is a laminar flow and may assist to control pressure and velocity of fluid entering the nozzle 60 at the inner surface 81. Notably, the transitional portion 42 includes smooth surface that transitions from a slender lumen cross sectional dimension to a wider lumen cross sectional dimension. The inner surface 81 of the conditioning region 80 may include a generally cylindrical shape that includes rounded outer edges positioned generally normal to the elongated inner surface of the fluid lumen 50 to provide a smooth transition for fluid flow therein.

Figure 24:
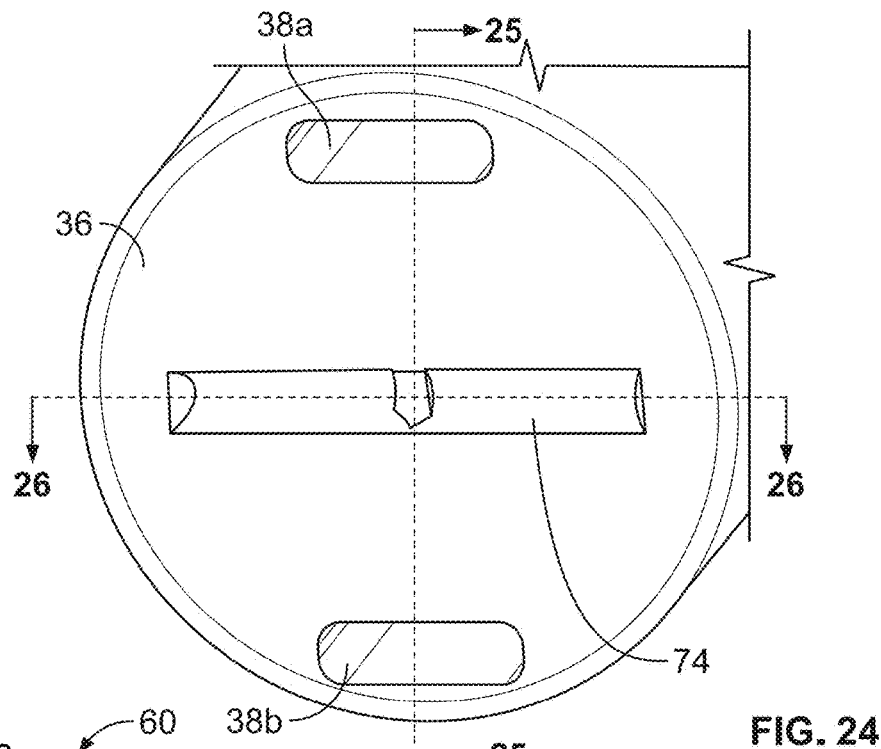
FIG. 24 is a perspective view of an embodiment of the nozzle tip assembly with a horizontal spray outlet channel.
Figure 25:
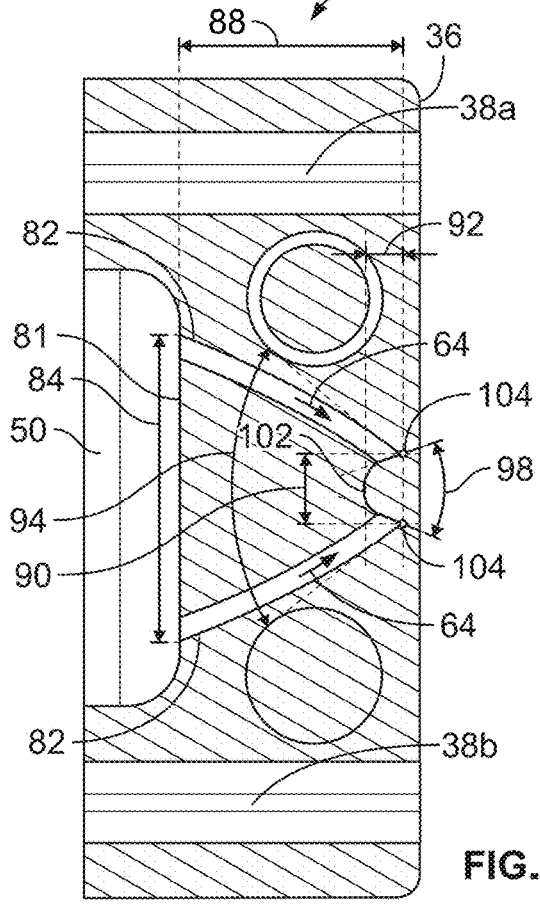
FIG. 25 is a cross sectional view of the embodiment of the nozzle tip assembly with a horizontal spray outlet channel along line 25-25 in FIG. 24.
Figure 26:
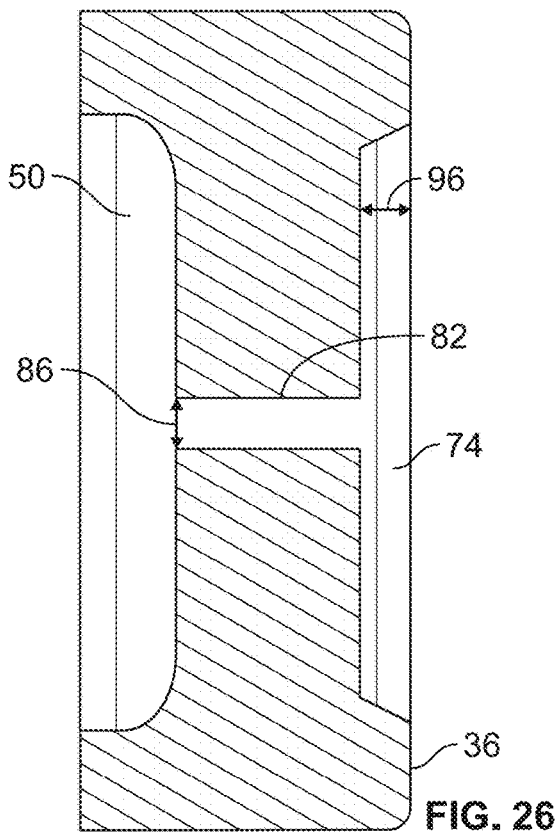
FIG. 26 is a cross sectional view of the embodiment of the nozzle tip assembly with a horizontal spray outlet channel along line 26-26 in FIG. 24.

As shown collectively in FIG. 24, FIG. 25 (which is a view taken along line 25-25 of FIG. 24), and FIG. 26 (which is a view taken along line 26-26 of FIG. 24), features of nozzle 60 are now discussed. Nozzle 60 includes a pair of converging channels 82 that extends from the inner surface 81 within a converging region of the fluid lumen 50 to the fluid outlet 72 aligned within the recess 74. The converging channels 82 may be slightly curved to produce converging jets of fluid therein wherein the distance between the converging channels 82 at their respective connections with fluid lumen 50 along the inner surface 81 may be defined by a feed height 84. The converging channels 82 may receive fluid from the fluid lumen 50 and cause fluid jets to impinge at fluid outlet 72 and may migrate along the recess 74 to form an impinging jet or shear spray pattern distributed therefrom. The recess 74 may provide space for a spray pattern formation upon the fluid jets exiting the nozzle 60.

More specifically, the converging channels 82 extend into the recess 74, the channels 82 subtending at a jet angle 94, and the recess 74 subtending at a throat angle 98 wherein the jet angle 94 and the throat angle 98 are opening or diverging in an opposite sense relative to one another. The distance between a point 102 at a base of the recess 74 that is furthest from proximal end 36, and a pair of points 104, which each point 104 corresponding to an intersection of the recess 74 and the channel 82 that is the largest dimension as measured in a direction perpendicular to proximal end 36 is an offset length 92. The distance between points 104 as measured in a direction parallel to proximal end 36 is an offset height 90. The distance between a line coincident with points 104 and the inner surface 81 of fluid lumen 50 as measured in a direction perpendicular to proximal end 36 is a feed length 88. The width of channels 82 define a feed width 86. The distance between point 102 and proximal end 36 defines a throat length 96 of recess 74. It is apparent from the FIGS. 24, 25, and 26 that the following relationships are determined wherein the feed height 84 is generally greater than the offset height 90. Further, the feed length 70 is generally greater than the offset length 92 and may be greater than the throat length 96. Many of these dimensions are interrelated and assist to generate the desired fluid spray pattern. Desired spray pattern is dependent on both the shear nozzle geometry and the feed conditioning upstream within the fluid lumen 50.

Figure 27:
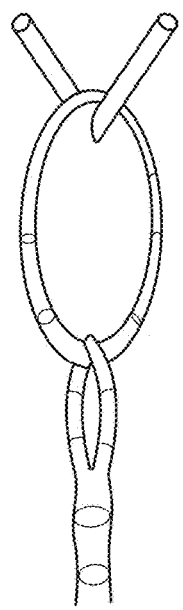
FIG. 27 is a schematic diagram of a spray of fluid from an embodiment of the nozzle tip assembly.
Figure 28:
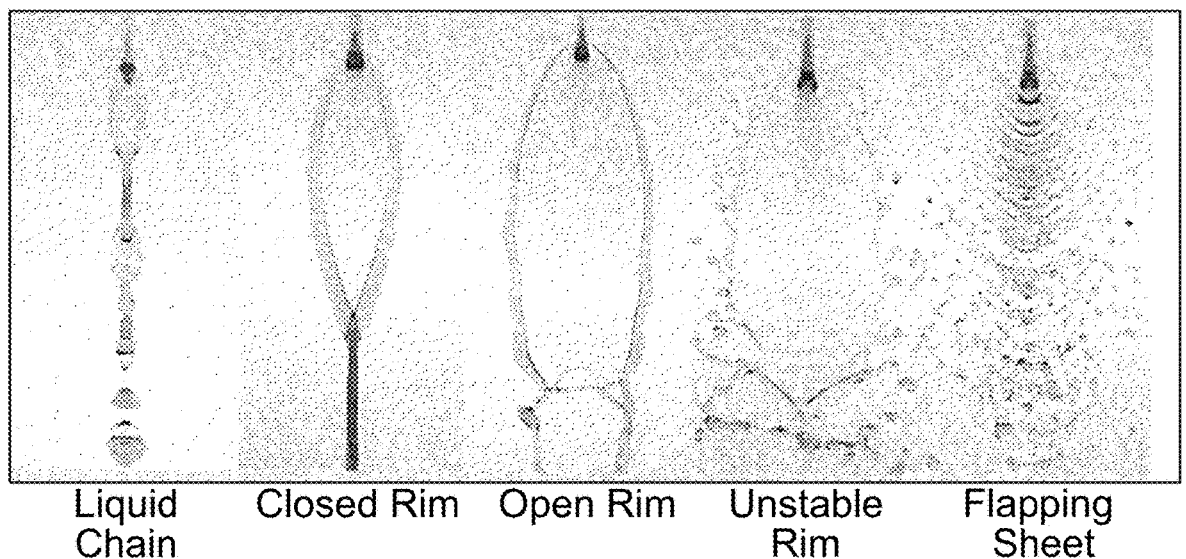
FIG. 28 illustrate schematic diagrams of patterns of fluid sprays of various velocities.

FIG. 27 shows a flow sheet pattern resulting from the arrangement of nozzle 60. More specifically, the nozzle 60 may operate having fluid spray patterns comparable to the Closed Rim and Open Rim patterns of FIG. 28 when adjusted properly and depending upon the inlet pressure, with the Unstable Rim, and Flapping Sheet flow pattern resulting in response to increasing velocity of the liquid flowing through nozzle 60. The sheet regime and sheet size of Closed Rim and Open Rim flow patterns may be predicted by Reynolds Number (which utilizes inertia/viscosity data of the liquid) and by the Weber number (which utilizes surface tension data of the liquid).

Figure 29A:
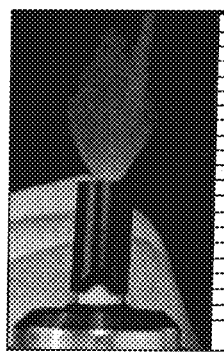
FIG. 29A is an image of a fluid spray from an embodiment of the nozzle tip assembly.
Figure 29B:
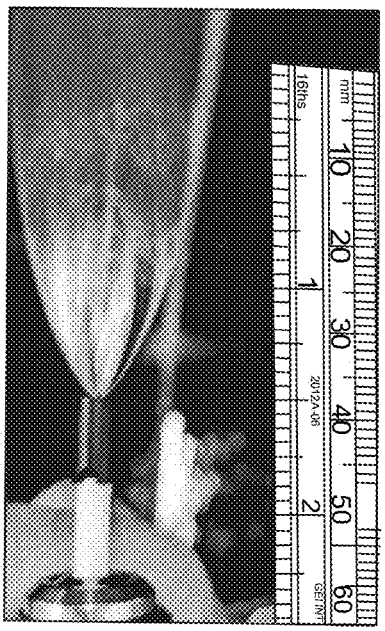
FIG. 29B is an image of a fluid spray from an embodiment of the nozzle tip assembly.
Figure 29C:
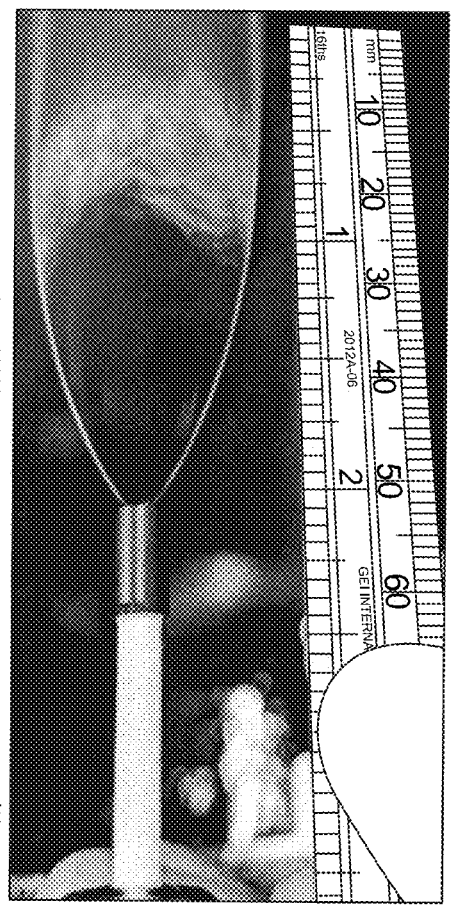
FIG. 29C is an image of a fluid spray from an embodiment of the nozzle tip assembly.
Figure 31:
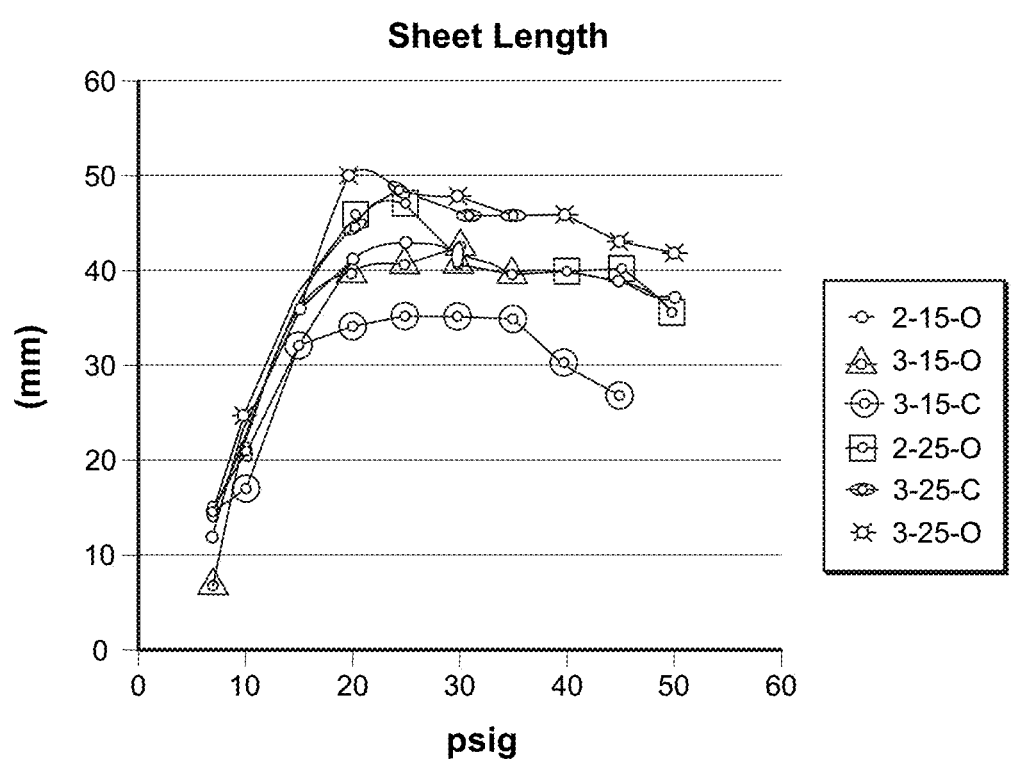
FIG. 31 is a table identifying sheet length of fluid sprays for various embodiments of the nozzle tip assembly.
Figure 32:
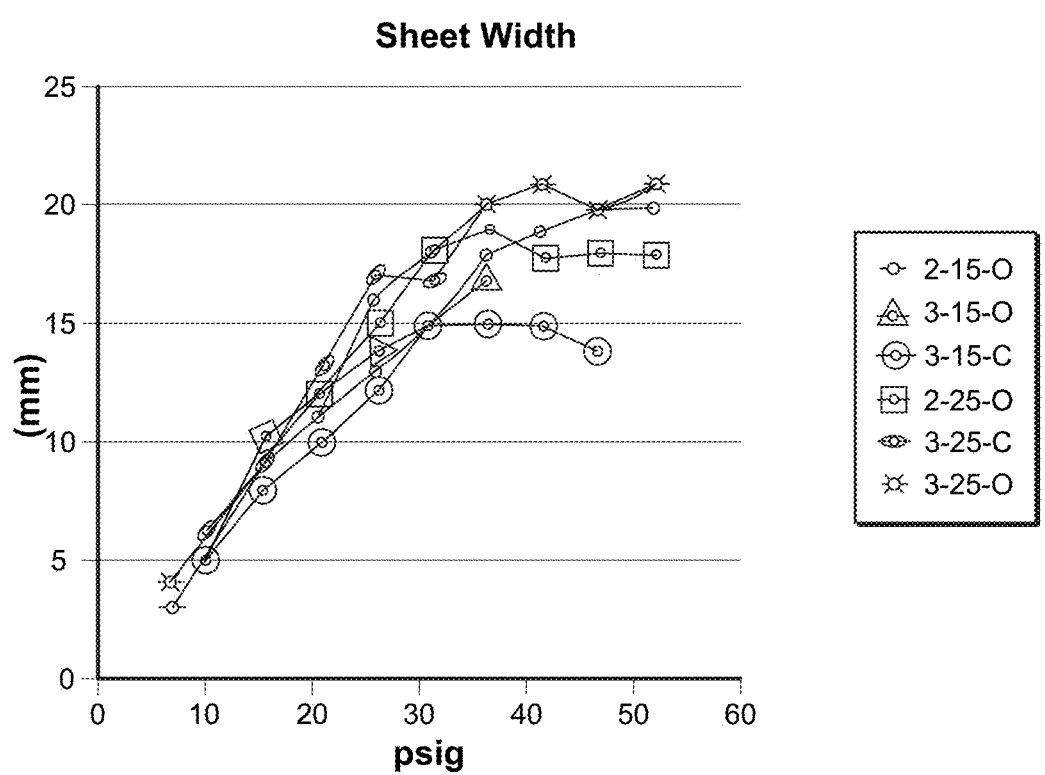
FIG. 32 is a table identifying sheet width of fluid sprays for various embodiments of the nozzle tip assembly.
Figure 33:
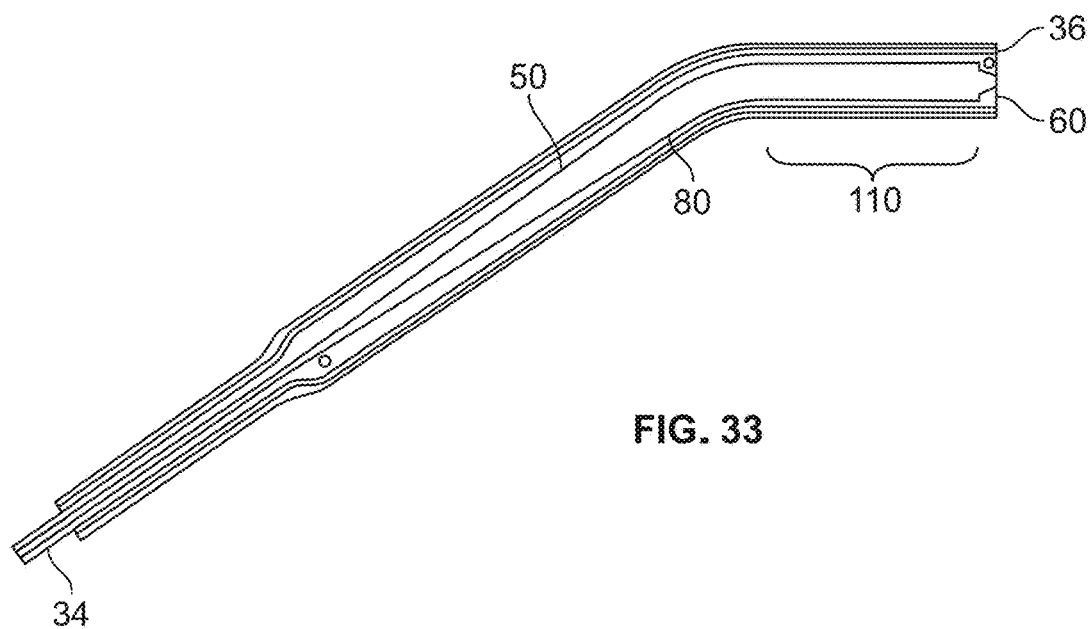
FIG. 33 is a cross sectional view of an embodiment of the nozzle tip assembly that illustrates internal fluid flow.
Figure 34:
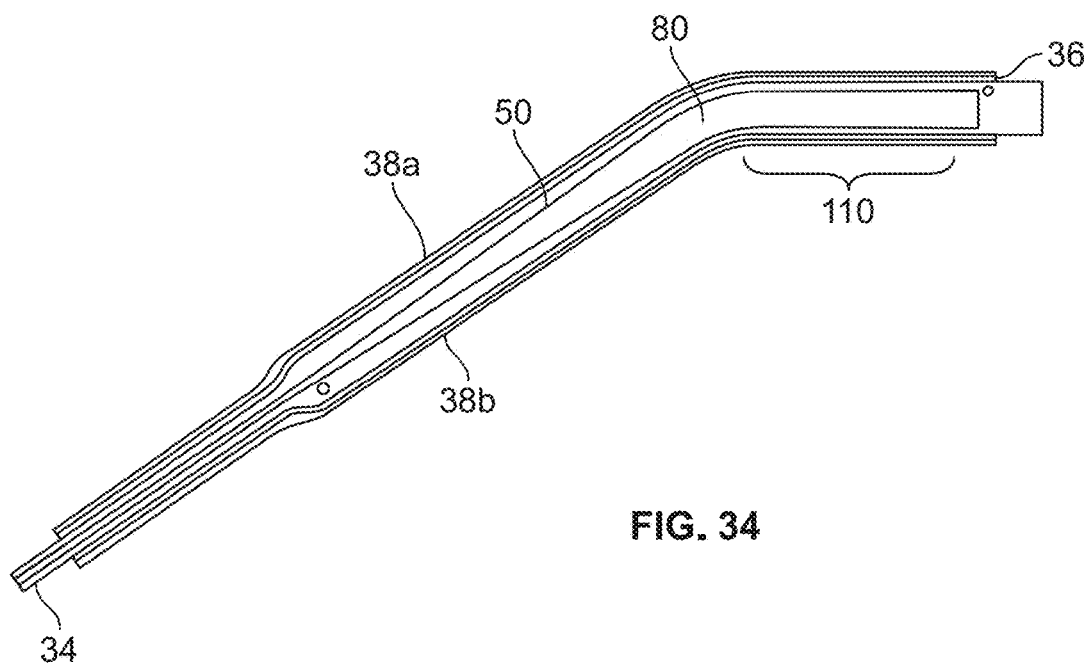
FIG. 34 is a cross sectional view of an embodiment of the nozzle tip assembly that illustrates internal air/gas flow.
Figure 35:
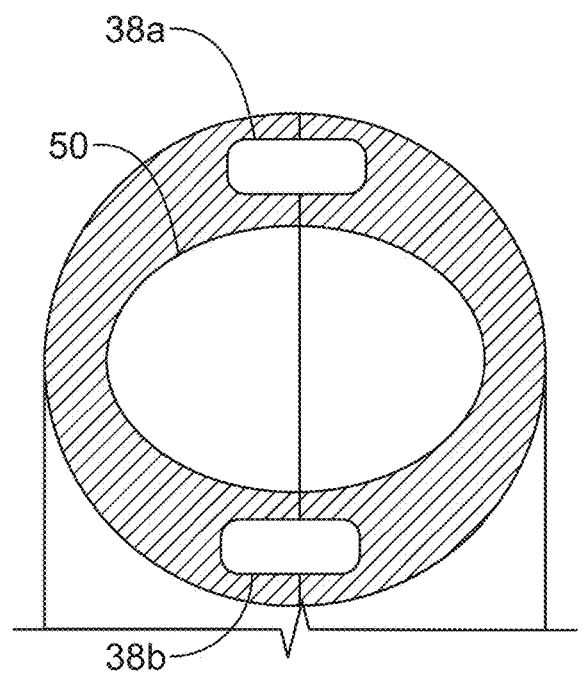
FIG. 35 is a cross sectional view of an embodiment of the nozzle tip assembly.
Figure 36:
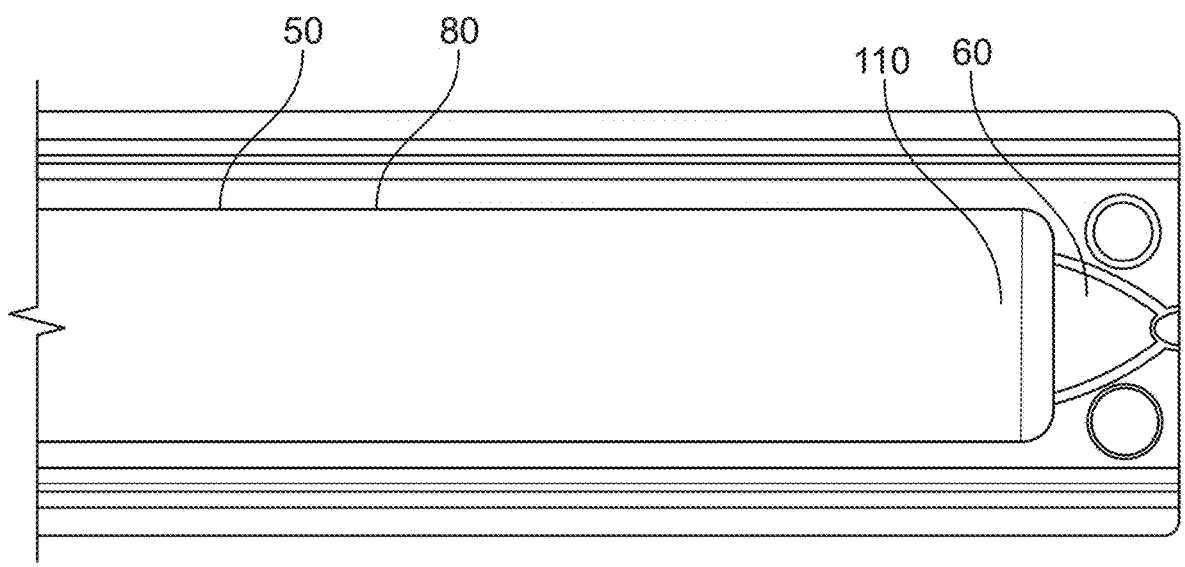
FIG. 36 is an enlarged cross sectional view of a proximal end of an embodiment of the nozzle tip assembly according to the present disclosure.

FIGS. 29A, 29B, and 29C show different open rim flow patterns formed utilizing differently sized tube lengths. FIG. 30 is a table showing different combinations of nozzle 60 parameters and the resulting flow patterns, with diagrams showing the flow sheet length versus fluid pressure of those different combinations of nozzle tube parameters (FIG. 31) and the flow sheet width versus fluid pressure of those different combination of nozzle tube parameters (FIG. 32). In one embodiment, proximal end 36 may be spaced between 2-10 mm from an application space such as a sensor surface to be cleaned or a mouth surface of a patient, sometimes referred to as a working distance.

FIG. 37 shows that to optimize a large stable flow sheet for nozzle 60, conditioning region 80 includes a conditioning length 110. In one embodiment, conditioning length 110 has a generally constant or unchanging cross-section, as well as lacking a bend or having a bend angle of zero degrees. In one embodiment, a conditioning length 110 of between 20-30 mm (approximately equaling 20 multiplied by feed length 786) to achieve a desired spray performance such as to produce a relatively large liquid sheet.

The described assembly of the instant disclosure has been described to include various embodiments that are contemplated for various applications. These applications include but are not limited to the following fields: wound care treatments, showers, faucets, camera and sensor cleaning, food processing, agriculture, pet grooming, as well as in health care fields.

The nozzle assembly may include a geometry that is unitary or split into several sub components to enable assembly of the resulting nozzle. The method includes forming a first member and a second member configured to form separate halves of the nozzle. Alternatively, the step may include forming a single unitary elongated body by 3D printing. The first member and second members may each include a nozzle geometry, formed by 3D printing, extruding, or molding wherein each includes a portion of a fluid lumen and at least one gas lumen with an attachment interface surface within the at least one first and second members. The pieces may be aligned to position the attachment interface surfaces in such a way that forms an interior lumen for providing a fluid such as water and also at least one interior lumen for gas or air The two pieces may then be joined together along edges of the interface surface to form the interior lumen aligned generally along a central axis of the nozzle pieces and an at least one exterior lumen positioned above and/or below the first lumen separate from the fluid lumen. The members may be adhered or welded together. The weld may be applied by an energy source through a flat portion that exists along the length and outer surface of at least one of the first or second members.

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A dual spray nozzle tip assembly configured to be attached to a device to provide a pressurized fluid and a pressurized gas comprising:

an elongated body defining a fluid lumen and at least one gas lumen between a distal end and a proximal end;

said elongated body including at least an attachment profile provided along the distal end, a straight portion, and an outlet region provided along the proximal end, a bend portion positioned along a length of the elongated body between the straight portion and the outlet region, said outlet region defines a shear nozzle in communication with the fluid lumen and at least one gas outlet in communication with the at least one gas lumen, said shear nozzle and at least one gas outlet are positioned along the proximal end, wherein the outlet region is configured to direct the pressurized gas from the at least one gas outlet and to direct the pressurized fluid from the shear nozzle in a fluid spray pattern;

wherein said elongate body includes an elongated cylindrical shape defined by a first member and a second member shaped to be attached to one another along inner surfaces to form the fluid lumen and the at least one gas lumen to allow for the transfer of a fluid as well as separately allow for the transfer of gas therein;

wherein at least one of the first member and the second member include an outer surface shape having at least one flat portion formed along said outer surface, said flat portion is shaped to include an elongated groove that is formed at least partially along a length of the elongated body; and wherein the at least one flat portion is formed along an entire length of the first member or second member and wherein the first member is attached to the second member by welding.

2. The dual spray nozzle tip assembly of claim 1 wherein the at least one flat portions includes four elongated flat portions are formed along a length of the first member and positioned to complement a portion of the inner surface of the first member that is to be welded to the inner surface of the second member to also define the lumens therein.

3. A dual spray nozzle tip assembly configured to be attached to a device to provide a pressurized fluid and a pressurized gas comprising:

an elongated body defining a fluid lumen and at least one gas lumen between a distal end and a proximal end;

said elongated body including at least an attachment profile provided along the distal end, a straight portion, and an outlet region provided along the proximal end, a bend portion positioned along a length of the elongated body between the straight portion and the outlet region, said outlet region defines a shear nozzle in communication with the fluid lumen and at least one gas outlet in communication with the at least one gas lumen, said shear nozzle and at least one gas outlet are positioned along the proximal end, wherein the outlet region is configured to direct the pressurized gas from the at least one gas outlet and to direct the pressurized fluid from the shear nozzle in a fluid spray pattern;

wherein said elongate body includes an elongated cylindrical shape defined by a first member and a second member shaped to be attached to one another along inner surfaces to form the fluid lumen and the at least one gas lumen to allow for the transfer of a fluid as well as separately allow for the transfer of gas therein;

wherein at least one of the first member and the second member include an outer surface shape having at least one flat portion formed along said outer surface, said flat portion is shaped to include an elongated groove that is formed at least partially along a length of the elongated body; and wherein the first member is made from a transmissive material and the second member is made of an absorptive material wherein the at least one flat portion is configured to permit an energy source to pass through transmissive material in the first member to reach and achieve a welding joint between the first and second members along the length of the elongated body.

4. The dual spray nozzle tip assembly of claim 3, wherein the welding joint is formed along an edge of said fluid lumen and an edge of the at least one gas lumen along an interfacing contact surface of the first and second members.

5. A dual spray nozzle tip assembly configured to be attached to a device to provide a pressurized fluid and a pressurized gas comprising:

an elongated body defining a fluid lumen and at least one gas lumen between a distal end and a proximal end;

said elongated body including at least an attachment profile provided along the distal end, a straight portion, and an outlet region provided along the proximal end, a bend portion positioned along a length of the elongated body between the straight portion and the outlet region, said outlet region defines a shear nozzle in communication with the fluid lumen and at least one gas outlet in communication with the at least one gas lumen, said shear nozzle and at least one gas outlet are positioned along the proximal end, wherein the outlet region is configured to direct the pressurized gas from the at least one gas outlet and to direct the pressurized fluid from the shear nozzle in a fluid spray pattern;

wherein said elongate body includes an elongated cylindrical shape defined by a first member and a second member shaped to be attached to one another along inner surfaces to form the fluid lumen and the at least one gas lumen to allow for the transfer of a fluid as well as separately allow for the transfer of gas therein; and wherein the at least one gas lumen and gas outlet straddle a weld joint between the first member and the second member.

6. A dual spray nozzle tip assembly configured to be attached to a device to provide a pressurized fluid and a pressurized gas comprising:

an elongated body defining a fluid lumen and at least one gas lumen between a distal end and a proximal end;

said elongated body including at least an attachment profile provided along the distal end, a straight portion, and an outlet region provided along the proximal end, a bend portion positioned along a length of the elongated body between the straight portion and the outlet region, said outlet region defines a shear nozzle in communication with the fluid lumen and at least one gas outlet in communication with the at least one gas lumen, said shear nozzle and at least one gas outlet are positioned along the proximal end, wherein the outlet region is configured to direct the pressurized gas from the at least one gas outlet and to direct the pressurized fluid from the shear nozzle in a fluid spray pattern; and wherein the shear nozzle includes a pair of converging channels that extends from an inner surface of a converging region of the fluid lumen to the fluid outlet aligned within a recess, wherein the converging channels are configured to receive fluid from the fluid lumen and cause pressurized fluid to impinge at the fluid outlet and migrate along the recess to form the fluid spray pattern distributed therefrom.

7. The dual spray nozzle tip assembly of claim 6 wherein the converging channels are curved to produce converging jets of fluid therein.

* * * * *